(12) United States Patent
Dix et al.

(10) Patent No.: US 9,097,342 B2
(45) Date of Patent: Aug. 4, 2015

(54) METHOD FOR ESTIMATING AND CONTROLLING DRIVELINE TORQUE IN A CONTINUOUSLY VARIABLE HYDRO-MECHANICAL TRANSMISSION

(75) Inventors: Peter J. Dix, Naperville, IL (US); Garth H. Bulgrien, Ephrata, PA (US); Robert C. Prasse, Chicago, IL (US); Cecil A. Weeramantry, Darien, IL (US); Haibo Guo, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 1027 days.

(21) Appl. No.: 12/652,490

(22) Filed: Jan. 5, 2010

(65) Prior Publication Data

US 2011/0166752 A1 Jul. 7, 2011

(51) Int. Cl.
| | |
|---|---|
| *G06F 19/00* | (2011.01) |
| *F16H 61/472* | (2010.01) |
| *F16H 47/04* | (2006.01) |
| *F16H 59/70* | (2006.01) |
| *F16H 37/08* | (2006.01) |

(52) U.S. Cl.
CPC ............. *F16H 61/472* (2013.01); *F16H 47/04* (2013.01); *F16H 59/70* (2013.01); *F16H 2037/0886* (2013.01)

(58) Field of Classification Search
CPC ............... F16H 2059/6861; F16H 2059/6846; F16H 2059/6884; F16H 2059/6892
USPC ............................................................ 701/50
See application file for complete search history.

(56) References Cited

U.S. PATENT DOCUMENTS

| | | | |
|---|---|---|---|
| 3,687,210 A | 8/1972 | Schaefer | |
| 3,927,528 A | 12/1975 | van der Kolk et al. | |
| 3,969,896 A | 7/1976 | Louis | |
| 4,111,073 A | 9/1978 | Chana | |
| 4,444,286 A | 4/1984 | Hawkins et al. | |
| 4,823,552 A | 4/1989 | Ezell et al. | |
| 4,845,950 A | 7/1989 | Metzner | |
| 4,976,332 A | 12/1990 | Hein | |
| 5,267,441 A | 12/1993 | Devier et al. | |
| 5,341,311 A | 8/1994 | Liebler | |
| 5,560,203 A | 10/1996 | Pollman | |
| 5,628,188 A | 5/1997 | Kordak | |
| 5,931,758 A | 8/1999 | Walter | |
| 5,951,258 A | 9/1999 | Lueschow et al. | |
| 6,260,440 B1 * | 7/2001 | Cronin et al. | 74/733.1 |
| 6,427,441 B2 | 8/2002 | Wüstefeld et al. | |
| 6,440,026 B1 | 8/2002 | Johnson et al. | |
| 6,442,934 B1 | 9/2002 | Okuda et al. | |
| 6,450,912 B2 | 9/2002 | Todeschini | |
| 7,063,638 B2 | 6/2006 | Weeramantry | |
| 7,146,263 B2 | 12/2006 | Guven et al. | |

(Continued)

*Primary Examiner* — John Q Nguyen
*Assistant Examiner* — Kyung Kim
(74) *Attorney, Agent, or Firm* — Sue C. Watson (57) ABSTRACT

The method of estimating and controlling driveline torque in a continuously variable hydro-mechanical transmission uses pressure data and other metrics of a hydrostatic power unit of the transmission in lieu of actual driveline torque data. A mechanical efficiency of the transmission is determined as a function of whether the power unit is operating in a power generation or regeneration mode, and the torque output of the power unit is estimated from that and other hydrostatic parameters. This is used to estimate a torque output of a planetary power unit of the transmission, and the torque on an output member of the driveline is then estimated using that value, and appropriate corrective action taken.

15 Claims, 7 Drawing Sheets

(56) References Cited

U.S. PATENT DOCUMENTS

| | | |
|---|---|---|
| 2003/0005691 A1 | 1/2003 | Kita et al. |
| 2007/0119161 A1 | 5/2007 | Du et al. |
| 2007/0137338 A1* | 6/2007 | Nishi et al. ............ 74/335 |
| 2007/0219693 A1 | 9/2007 | Stratton et al. |
| 2008/0250781 A1 | 10/2008 | Mueller et al. |
| 2010/0087993 A1* | 4/2010 | Roli et al. ............ 701/51 |

* cited by examiner

METHOD FOR ESTIMATING AND CONTROLLING DRIVELINE TORQUE IN A CONTINUOUSLY VARIABLE HYDRO-MECHANICAL TRANSMISSION

TECHNICAL FIELD

The present invention relates generally to estimating and controlling driveline torque in a continuously variable hydro-mechanical transmission, and more particularly, to a method that does so using pressure data and other metrics of the hydrostatic unit, in lieu of actual driveline torque data.

BACKGROUND ART

Continuously variable hydro-mechanical transmissions are used in a variety of work machines, including for construction, earth moving, forestry, and agriculture. Reference in this regard, Weeramantry, U.S. Pat. No. 7,063,638 B2, issued Jun. 20, 2006, which discloses a representative continuously variable hydro-mechanical transmission. Typically, a continuously variable hydro-mechanical transmission will have a hydrostatic unit as one power input to a planetary gear set, and a mechanical connection to the engine of the machine as a second power input, with the output of the planetary connected via a clutch to one or more final gear reductions in connection with a load, e.g., the wheels, tracks or other drivers of the machine.

An advantage of continuously variable hydro-mechanical transmissions is that they can provide a large speed range seamlessly. As another advantage, continuously variable hydro-mechanical transmissions are typically capable of lower gear ratios than transmissions with fixed gear ratios. As a result, the engine and transmission combination can produce higher torques to the wheels, tracks, or other drivers, which is beneficial as it enables the work machine to pull harder. However, the higher torque can damage mechanical aspects of the transmission, particularly, the final gear reduction or output member of the driveline of the transmission. Typically, it is been found that damage to the final gear reduction or output member will occur if the torque is too high for a prolonged period of time.

In agricultural applications, such as wherein a work vehicle such as when a tractor is pulling a large implement, or a deep subsurface tillage tool, a heavy wagon or cart, or the like, potentially damaging continuous high torque loads can be placed on the transmission driveline. Damage from intermittent or incidental high loads can also result from ground conditions, e.g., inclines, ruts, deep furrows, wet spots, transitions onto roads, and the like, when driving, and from contact with denser soil, buried objects such as stones or rock formations, large roots, and the like when doing subsurface tillage.

To avoid such damage, one alternative is to limit engine torque output. However, often the engine supplies power to other systems of the work machine, e.g., auxiliary hydraulics, power take offs, and the like, and it can be problematic to reduce toque output to those systems also. The torque loads of these other systems typically vary and may be unknown, making accurately adjusting engine torque difficult. As another alternative, the transmission torque can be determined using an estimate of the engine torque and subtracting the torque loads of the other systems, or using maximum torque values for those systems, but this is often more complex, more costly and less accurate than desired.

Thus, what is sought is a manner of determining driveline torque of a continuously variable hydro-mechanical transmission of a work machine, particularly in the vulnerable final gear reduction of the driveline, and limiting the torque for preventing damage to the transmission, without the shortcomings set forth above.

SUMMARY OF THE INVENTION

What is disclosed is a method of estimating driveline torque of a continuously variable hydro-mechanical transmission of a work machine, particularly in the final gear reduction or output member, and limiting the torque for preventing damage to the transmission, without the shortcomings set forth above.

During operation of a continuously variable hydro-mechanical transmission, operating parameters of the hydrostatic power unit, mainly a swash plate angle of a variable displacement pump, and/or the ratio of the final gear reduction of the driveline, will be automatically varied, continuously if required, by the transmission controller, to achieve and hold an inputted command, usually a speed command. The pump of the hydrostatic power unit is drivingly connected to the engine of the work machine, and the fluid motor is drivingly connected to the planetary power unit. In a power generation mode, the pump operates to pump pressurized fluid through the motor at a rate determined by the engine speed, a ratio of connecting gears, and the swash plate angle, to rotate the motor, which, in turn, drives an element of the planetary power unit, usually the ring gear. The direction of rotation is also determined by the swash plate angle. In a regeneration mode, the direction of power through the hydrostatic power unit is reversed, and the ring gear of the planetary power unit drives the fluid motor, operating it as a pump, and the pump as a motor.

It has been observed that the fluid pressure condition in the hydrostatic power unit will be high when the transmission driveline is subjected to high torque loads, which is of concern for the purposes of the present invention, typically when the machine is moving slowly, or is stationary, under heavy load. An operational example would be a tractor pushing or pulling a heavy load, or towing an implement such as a deep subsurface tillage tool. As noted above, if prolonged, damage to the driveline will likely result, so it is desired to avoid this.

It has also been observed that the hydrostatic power unit will have a mechanical efficiency which is a function of the pressure in that unit, swash plate angle, and pump speed. The efficiency will have a value of less than 1 when in the generation mode, and greater than 1 when in the regeneration mode. The motor of the hydrostatic power unit will have a mechanical efficiency which is a function of the pressure in that unit. Again, this pressure will be important for the purposes of the present invention only when high, approaching relief pressure, when potentially damaging driveline torque conditions are likely to be present. The driveline torque can reach a potentially damaging high level when the hydrostatic power unit is in the generation mode wherein the pump of that unit is functioning as a pump, and also when in the regeneration mode when the pump is being driven by the motor. The efficiency of the motor will preferably be determined by testing at least one high pressure for each operating mode, and recorded for later use. The efficiency value will be greater than 1 for the regeneration mode, and less than 1 for the generation mode.

According to one aspect of the invention, it has been found that the pressure in the hydrostatic power unit will provide an indication of the torque on that unit, and if the operating mode, e.g., generation, regeneration, and the mechanical efficiency of the fluid motor and direction of operation thereof are known at the pressure, a relatively accurate estimation of the torque on the fluid motor can be made. In turn, the torque on the output of the planetary power unit can be estimated as a function of the torque on the fluid motor and ratios of gears of the planetary unit and those connecting it with the motor. The accuracy of this torque can be increased by knowing the efficiency of the planetary unit. The torque load on the driveline, particularly on the output member thereof, can then be estimated as a function of the estimated torque on the planetary unit output, and the ratio of gears connecting the planetary unit to the driveline output member.

Thus, according to a preferred aspect of the invention, a method of the invention includes a step of monitoring operation of the hydrostatic power unit of the transmission to determine whether that unit is operating in a generation mode or a regeneration mode. The method will then determine a mechanical efficiency of the hydrostatic power unit, in particular the motor thereof, as a function of at least the operating mode, a pressure therein and an operating speed thereof, e.g., motor speed. This can be, for instance, a selected constant value for a particular high pressure value, or it can be a stored value previously determined from testing as noted above. The torque output of the hydrostatic power unit will then be estimated as a function of at least the pressure therein and the mechanical efficiency of the motor.

As a next step according to the invention, the torque output of the planetary power unit will be estimated, as a function of the estimated torque output of the hydrostatic power unit, a ratio of gears drivingly connecting the hydrostatic power unit to the planetary power unit, and ratios of the gears of the planetary unit. The torque on the output member of the driveline of the transmission will then be estimated as a function of the estimated torque output of the planetary power unit and ratios of gears drivingly connecting the planetary unit to the output member.

According to another aspect of the invention, if the estimated torque on the output member is greater than a predetermined value, for instance, a threshold value above which damage to the driveline is likely to occur, then an operating parameter of the transmission will be changed to reduce the torque. As one example, if the machine is moving, the speed of movement can be lowered, but preferably without reducing engine speed, such that other systems run by the engine are not affected. As another example, the swash plate angle can be changed, to lower the pressure in the hydrostatic power unit and thus the torque output thereof.

DETAILED DESCRIPTION OF THE INVENTION

Figure 1:
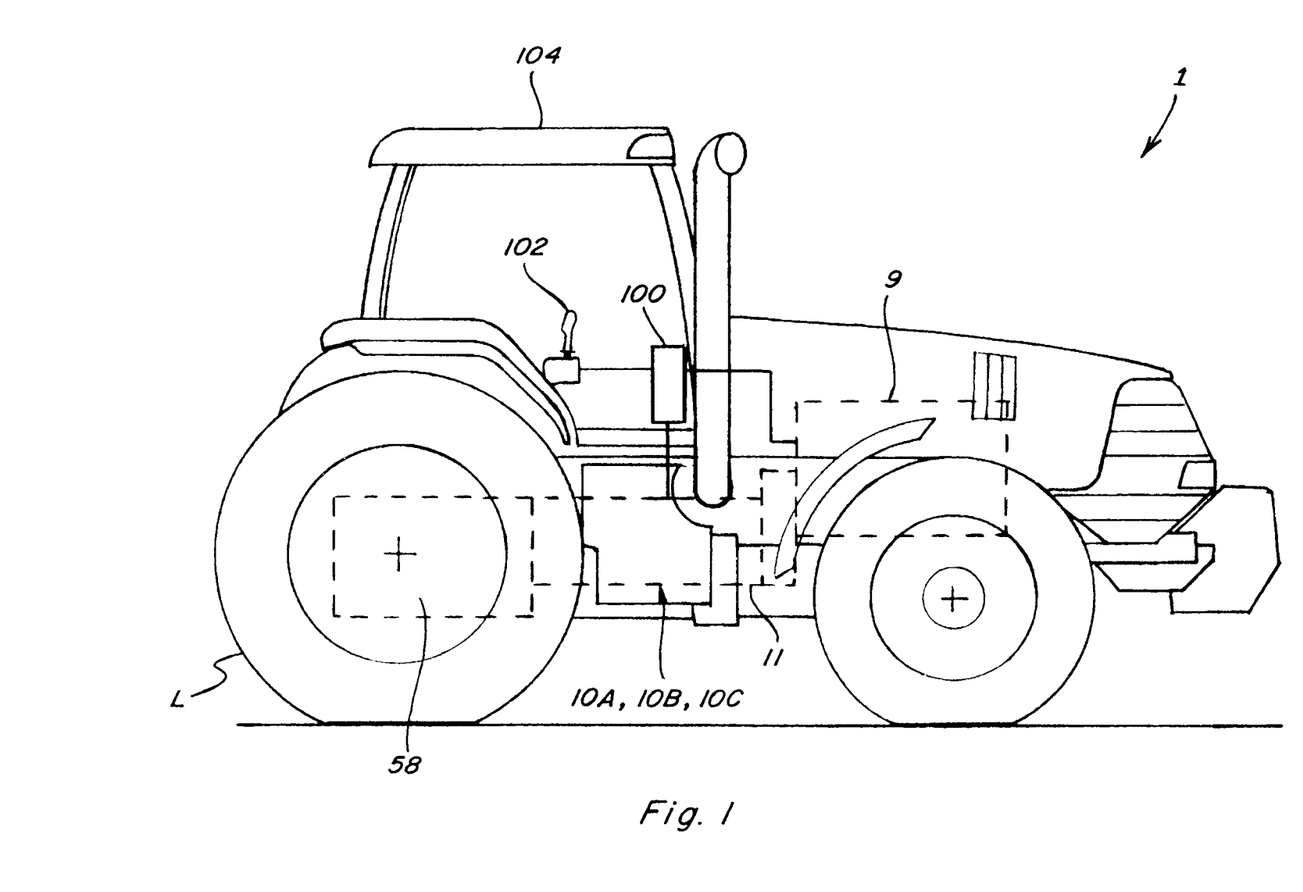
FIG. 1 is a side view of a representative work machine including a continuously variable hydro-mechanical transmission controlled according to the method of the invention.

Referring now to the drawings, in FIG. 1 a work machine 1 is shown, which is a tractor representative of those that can be used for a variety of uses, including, but not limited to, agriculture, construction, earth moving and forestry. Work machine 1 includes a power source 4 which will be, for instance, an internal combustion engine, and is mechanically coupled to a continuously variable hydro-mechanical transmission, three representative variants or embodiments of which are represented by numbers 10A, 10B and 10C, like parts of which being identified by like numbers. Each of transmissions 10A, 10B and 10C is controllably operable according to the method of the invention, for estimating and limiting driveline torque of the transmission, and the transmissions shown are intended to be exemplary of a wide range of possible hydro-mechanical architectures wherein the power is split between paths and different ranges are used, with which the present invention can be used.

Figure 2:
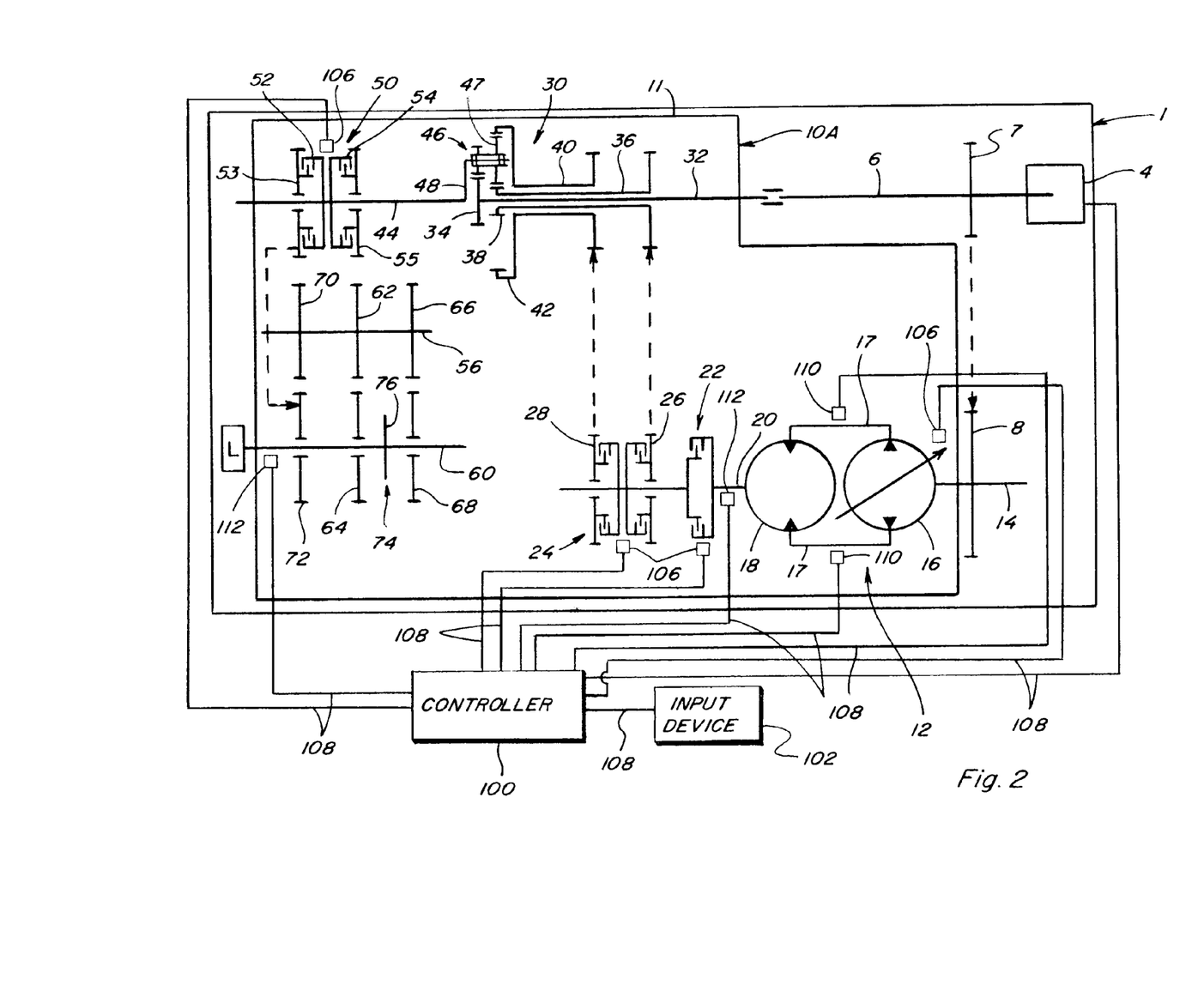
FIG. 2 is a simplified schematic representation of the work machine of FIG. 1, showing one of the embodiments of the transmission.
Figure 3:
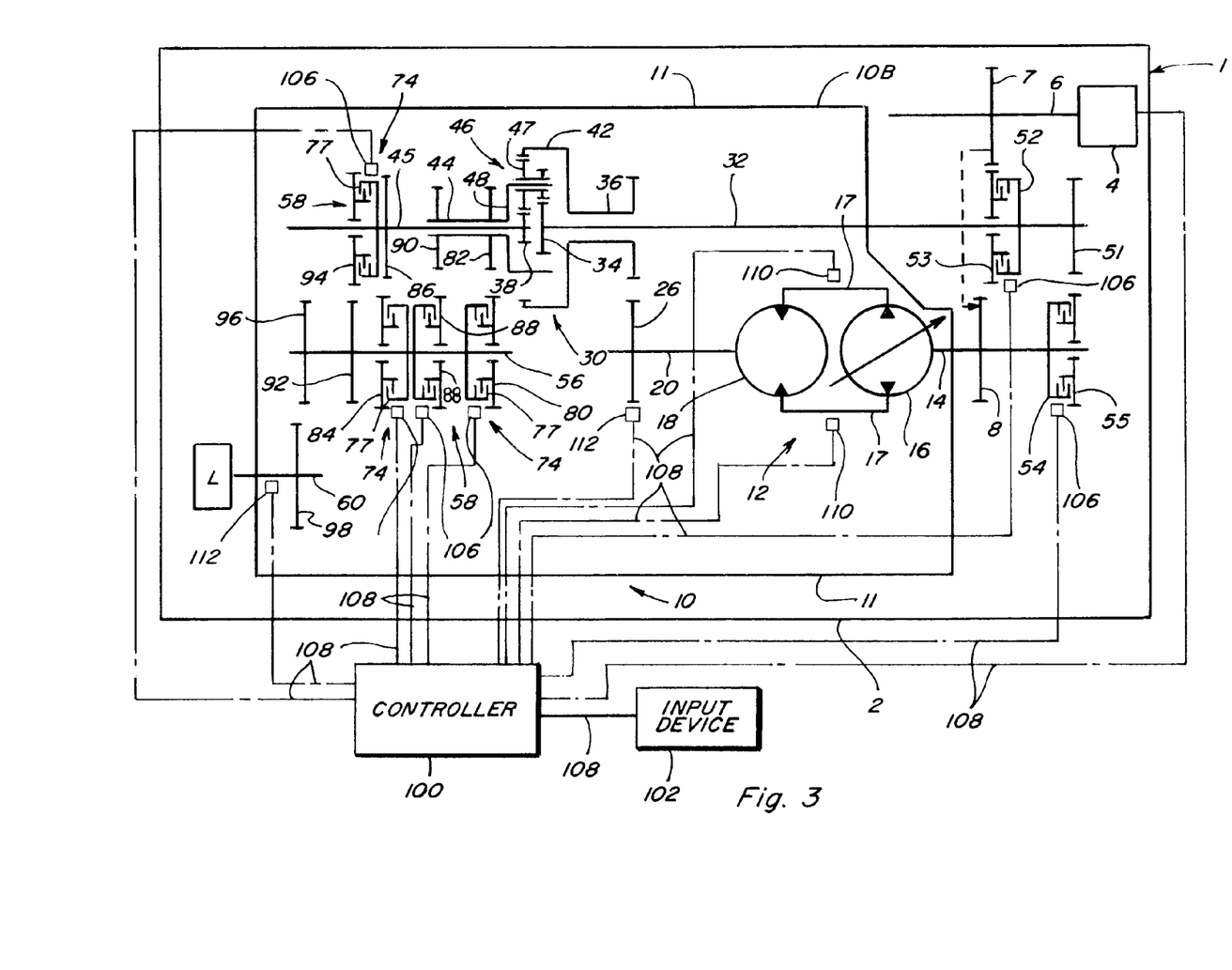
FIG. 3 is a simplified schematic representation of the work machine, showing another embodiment of the transmission.
Figure 4:
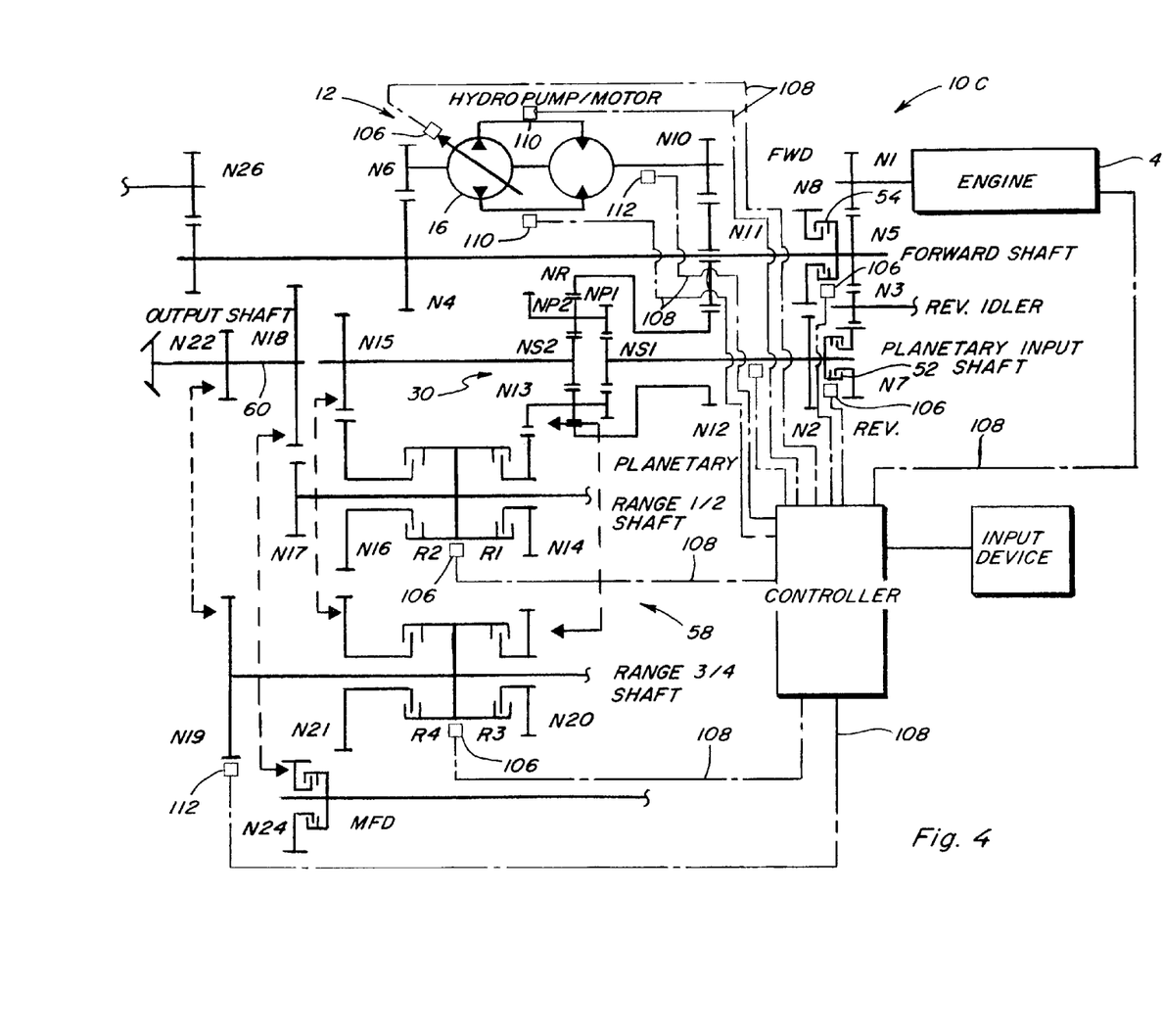
FIG. 4 is a simplified schematic representation of another embodiment of the transmission.

Referring also to FIGS. 2, 3 and 4, each of transmissions 10A, 10B and 10C includes a hydrostatic power unit 12 and a planetary power unit 30 which are coupled to a driveline including a range gear set 58 mounted within a transmission housing 11 and coupled to a load L which here is the drive wheels of machine 1 as shown in FIG. 1. It should be understood that machine 1 can alternatively include a load L that comprises a track drive, or an operating system of the machine such as but not limited to, a power take off (PTO).

Referring in particular to FIG. 2, hydrostatic power unit 12 of transmission 10A includes a fluid pump 16 coupled by fluid conduits 17 in a closed loop to a fluid motor 18. Power unit 12 includes a first input shaft 14 drivingly connected to pump 16 and a first output shaft 20 drivingly connected to motor 18. Power unit 12 is coupled to a synchronous lockup clutch 24 by first output shaft 20. Depending upon the desired speed of work machine 1 or the desired rpm of the load L, inputted to a processor based controller 100 by an input device 102 located preferably in operator cab 104 of machine 1, clutch 24 will be automatically actuated by controller 100 to couple drive gear 26 to input shaft 36, or drive gear 28 to input shaft 40, to select an appropriate hydrostatic input gear range. At the same time, controller 100 also adjusts the angle of a swash plate of pump 16. As an exemplary embodiment, pump 16 can be an electronically controlled variable displacement hydraulic pump. A hydrostatic power unit driving gear 7 coupled to the input shaft 6 from the power source 4 with the hydrostatic power unit driving gear 7 engaging a hydrostatic power unit driven gear 8 that is coupled to the first input shaft 14 drives the hydrostatic power unit 12.

Figure 5:
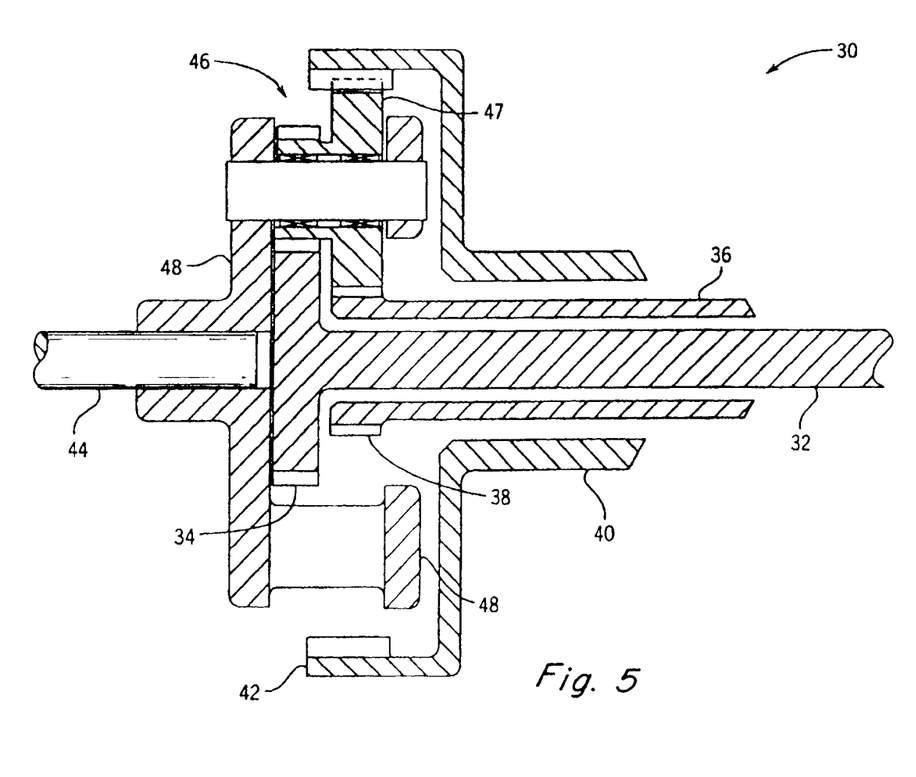
FIG. 5 a partial sectional view of an exemplary embodiment of a planetary power unit for the transmission of FIG. 2.

Planetary power unit 30 is coupled to the power source 4 with a second input shaft 32 and the input shaft 6. The planetary power unit 30 also includes a third input shaft 36, a fourth input shaft 40 and a second output shaft 44. The second input shaft 32, the third input shaft 36, the fourth input shaft 40 and the second output shaft 44 are all coaxial with the second input shaft 32 inside the hollow third input shaft 36 which in turn is within the fourth input shaft 40 as shown in FIG. 5. The planetary power unit 30 is selectively coupled to the load L; selectively coupled to the hydrostatic power unit 12; and coupled to the power source 4, automatically by controller 100 utilizing various clutches as will be described below. The hydro-mechanical transmission 10A also includes a load shaft 60 which is coupled to the load L and mounted for rotation in the housing 11. An intermediate shaft 56 rotatably mounted in the housing 11 supports a range gear set 58 mounted for rotation in the housing 11 and selectively coupled to the planetary power unit 30 and the load shaft 60.

The planetary power unit 30 comprises a primary sun gear 34 coupled to the second input shaft 32, which is directly coupled to the power source via input shaft 6. A secondary sun gear 38 is coupled to the third input shaft 36, which is selectively coupled to the first output shaft 20 by synchronous lockup clutch 24 under control of controller 100. A ring gear 42 is coupled to the fourth input shaft 40, which is selectively coupled to the first output shaft 20 also with the synchronous lockup clutch 24 under control of the controller. A compound planetary gear cluster 46 mounted on a compound planetary gear carrier 48 engages with the primary sun gear 34, the secondary sun gear 38 and the ring gear 42. The compound planetary gear carrier 48 is coupled to the second output shaft 32 of the planetary power unit 30. Compound planetary gear carrier 48 supports three compound planetary gears 47 which make up the compound planetary gear cluster 46.

The synchronous lockup clutch 24 is controlled by controller 100 to selectively engage driving gears 26 and 28 which engage third input shaft 36 and fourth input shaft 40, respectively. When driving gear 26 is driven by the hydrostatic power unit 12, it drives the secondary sun gear 38. When driving gear 28 is driven by the hydrostatic power unit 12, it drives the fourth input shaft 40, which in turn drives the ring gear 42 within planetary power unit 30. The above described power transmissions occur in the upstream side of unit 30 of the hydro-mechanical transmission 10A. On the down stream side of unit 30 a single output shaft, designated as the second output shaft 44 is coupled within unit 30 with the compound planetary gear carrier 48. The second output shaft 44 is coupled to the directional clutch 50, which has a forward component 54 and a reverse component 52 which respectively drive gears 55 and 53 to control the forward or reverse directions of the work machine 1, as selected by the operator through controller 100.

Intermediate shaft 56 is rotatably mounted in the housing 11 and supports a road range input gear 62, which in turn engages a road range output gear 64 mounted on the load shaft 60. A work range input gear 66 coupled to the intermediate shaft 56 engages a work range output gear 68 also mounted on the load shaft 60. A reverse gear 70 is coupled to the intermediate shaft 56 and engages an idler reverse gear 72 mounted on the load shaft 60. A range selector 74 is coupled to the load shaft and is controlled by the operator of machine 1 to select either the road range speeds or the work range speeds. In an exemplary embodiment of the hydro-mechanical transmission, the range selector 74 is a sliding collar or synchronizer 76.

Once the operator selects between the working range and road range speeds, controller 100 will automatically control the pump swash plate angle in the hydrostatic power unit 12 and the selection of one of the drive gears 26 or 28 coupled to the first output shaft 20 to achieve speed control. In low speeds, the hydrostatic drive is driven through ring gear 42, which is coupled to the fourth input shaft 40 and is driven by driving gear 28. The gear ratios in the planetary power unit 30 are designed so that a synchronous condition will occur at the most desirable speed within a given working range. With machine 1 starting from rest, the swash plate angle of the hydraulic motor 18 is automatically increased in order to increase machine or rpm speed until a synchronous speed is reached (i.e., the two sun gears, 34 and 38, the ring gear 42 and the planet carrier 48, supporting the compound planetary gear cluster 46 all rotate at the same speed). At that same speed, the synchronous lockup clutch 24 will be automatically actuated to disengage driving gear 28 and engage driving gear 26 to drive the secondary sun gear 38. With such change occurring automatically at a synchronous speed it is "seamless" with little or no energy dissipation. With the hydrostatic drive power being delivered through the secondary sun gear 38, the swash plate angle is reduced to increase speed of the compound planetary gear carrier 48 until a maximum speed of machine 1 is reached. It is also possible to engage both drive gears 26 and 28 with the synchronous lockup clutch 24 and with disconnect clutch 22 disconnecting output shaft 20 in which all gears of the planetary power unit 30 will be transmitting power and thereby providing a very high efficiency through the hydro-mechanical transmission 10A. Under some operating conditions, controller 100 will completely disengage the hydrostatic power unit 12 from the planetary power unit 30 through the hydrostatic disconnect clutch 22. In such instance, only direct mechanical power from the power source 4 is provided to the planetary power unit driving only the primary sun gear 34 which in turn drives the compound planetary gear cluster 46 and the second output shaft 44.

It is also possible for a full shuttle reverse in either the work range or road range by means of the directional clutch 50. Since the directional change occurs downstream of the planetary power unit 30, it is not necessary to change the swash plate position of the pump 16 in the hydrostatic power unit 12 if the same forward to reverse ratio is retained.

The configuration of the hydro-mechanical transmission, described above provides that the synchronized ratio change gear speeds takes place on the input side (upstream side) of the planetary power unit 30 in the hydrostatic power unit 12 with only one output shaft 44 from planetary power unit 30, under control of controller 100.

The control of the various clutches and the swash plate angle of the pump 16 in the hydrostatic power unit 12, will be automatically controlled by controller 100, using actuators 106 connected to controller via suitable conductive paths 108, which can be wires of a wiring harness, a wired or wireless communications network or the like, and which also connect to input device 102. Transmission 10A also includes appropriate sensors, including pressure sensors 110 for sensing pressure conditions in conduits 17 connecting pump 16 and motor 18, and speed sensors 112 for sensing a speed of first output shaft 20 and a speed of load shaft 60, all connected to controller 100 via conductive paths 108. Controller 100 is connected to power source 4, also via conductive paths 108, to receive data such as speed data, e.g., of input shaft 6, therefrom.

Referring in particular to FIG. 3, the second embodiment of a hydro-mechanical transmission 10B eliminates the operator preselected work range or road range of speeds per se. However, seamless speed changes from zero to a maximum speed, such as 50 km per hour can be obtained through four gear ranges defined as range "A", "B", "C", and "D" with synchronized shift points between each range to obtain the seamless speed changing. In this embodiment, the synchronized ratio changing is automatically controlled by a controller 100 and takes place on the output side (downstream side) of the compound planetary power unit 30 which has two coaxial output shafts 44 and 45. As with transmission 10A above, controller 100 is connected to the various actuators 106 of the clutches and pump 16, pressure sensors 110, and speed sensors 112, and also to input device 102 and power source 4, for receiving commands and data, via conductive paths 108.

Power source 4 of hydro-mechanical transmission 10B selectively drives hydrostatic power unit 12 and planetary power unit 30, which in turn drives a plurality of range gear sets 58 which are coupled to a load L, which, again, will typically be the wheels or tracks of machine 1. Hydrostatic power unit 12 as shown in FIG. 3 is contained within the hydro-mechanical transmission housing 11 but it may also be external to the housing 11 and accessed with appropriate couplings. The hydrostatic power unit 12 includes a pump 16 coupled to a motor 18 with the hydrostatic power unit 12 coupled to a first input shaft 14 and a first output shaft 20. The power to the hydrostatic power unit 12 is provided by a driven gear 8 mounted on the first input shaft 14 and engaged with a hydrostatic power unit driving gear 7 mounted on the input shaft 6 of the power shaft 4. The pump 16 is in fluid communication with the motor 18 by appropriate conduits 17. The first output shaft 20 rotatably supports a gear for engaging a third input shaft of unit 30 as described below.

Figure 7:
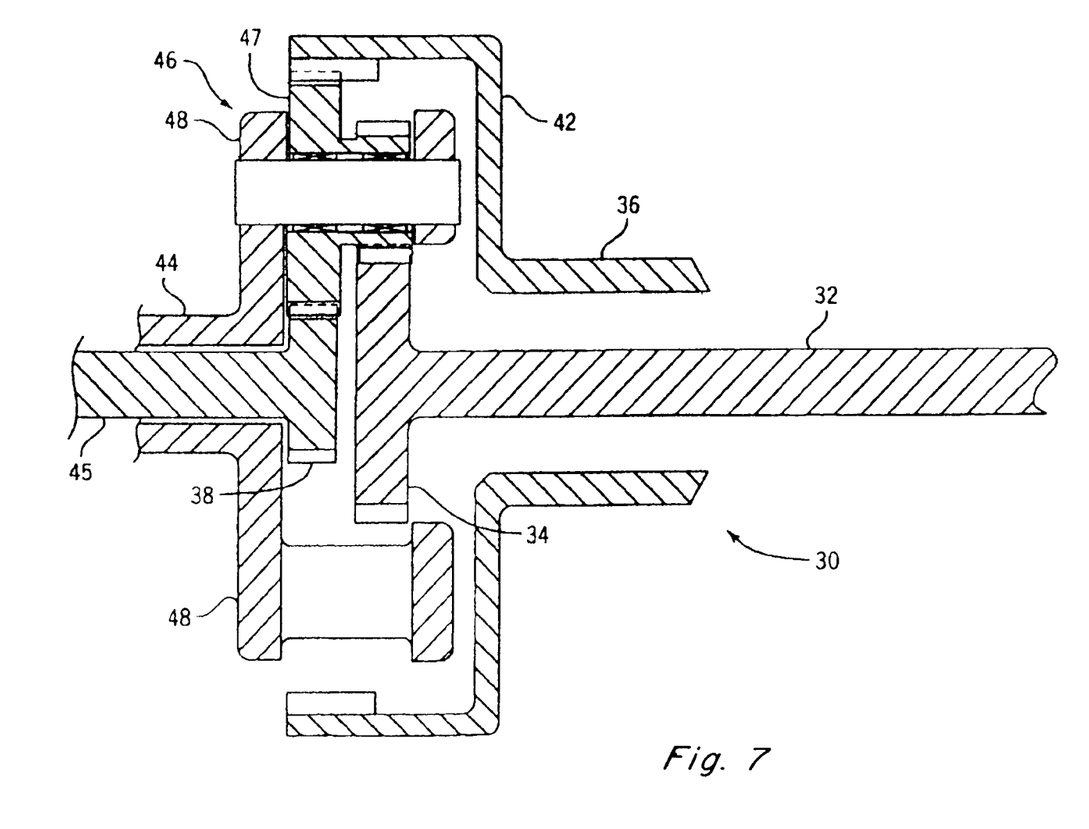
FIG. 7 is a partial view of an exemplary embodiment of a planetary power unit for the transmission of FIG. 3.

Planetary power unit 30 of transmission 10B includes a second input shaft 32, a third input shaft 36, a second output shaft 44 and a third output shaft 45 (see FIG. 7 also). Unit 30 is selectively coupled to the load L, coupled to the hydrostatic power unit 12 and selectively coupled to the power source 4. The unit 30 can be connected to a plurality of range gear sets 58 as will be described below. The second input shaft 32, the third input shaft 36, the second output shaft 44, and the third output shaft 45 are coaxial with the third input shaft being hollow and the second input shaft 32 being supported within the third input shaft 36. The second output shaft 44 is hollow and third output shaft 45 is supported within the hollow second output shaft 44. The hydro-mechanical transmission 10B also includes a load shaft 60 coupled to the load L and mounted for rotation in the housing. An intermediate shaft 56 supporting a plurality of range gear sets 58 is mounted for rotation in the housing and selectively coupled to unit 30 and the load shaft 60.

The planetary power unit 30 of the hydro-mechanical transmission 10B comprises a primary sun gear 34, which is coupled to the second input shaft 32. A ring gear 42 is coupled to the third input shaft 36 and coupled to the first output shaft 20 with the hydrostatic power unit with the gear 26 engaging the third input shaft 36. A compound planetary gear cluster 46 mounted on a compound planetary gear carrier 48 and engaged with the secondary sun gear 38 and the ring gear 42 is mounted within unit 30. A compound planetary gear carrier 48 is coupled to the second output shaft 44. The compound planetary gear cluster 46 includes three compound planetary gears 47.

In operation, the continuously variable hydro-mechanical transmission 10B can be operated to have a combined hydrostatic and mechanical power flow by engaging the reverse clutch 52 or forward clutch 54 which respectively drive a reverse drive gear 53 and a forward drive gear 55 which in turn drives the first input shaft 20 and the second input shaft 32. It is also possible to operate the hydrostatic mechanical transmission 10B for a pure hydrostatic power flow by disengaging both clutches 52 and 54 in which case the second input shaft 32 is not directly driven by the power source 4. In the pure hydrostatic mode, one range gear is coupled to carrier 48 and another range gear 58 is connected to the secondary sun gear 38 simultaneously.

The plurality of arranged gear sets 58 comprise an A-range output gear 80 coupled to the intermediate shaft 56 and engaged with an A-range input gear 82 mounted on the second output shaft 44. A B-range output gear 84 is coupled to the intermediate shaft 56 and engaged with a B-range input gear 86 mounted on the third output shaft 45. A C-range output gear 88 coupled to the intermediate shaft 56 and engaged with a C-range input gear 90 is mounted on the second output shaft 44. A D-range output gear 92 is coupled to the intermediate shaft 56 and engaged with D-range input gear 94 mounted on the third output shaft 45. A plurality of range selectors 74 are coupled to the intermediate shaft to provide the selection of range gear sets, under control of controller 100. A typical range selector 74 in this exemplary embodiment is a clutch 77 associated with the respective range gear sets. A main input drive gear 96 is coupled to the intermediate shaft 56 and engaged with a main output drive gear 98, which is mounted on the load shaft 60.

As stated above in this embodiment, there is no selection for a work range or road range per se. However, the four ranges (A-D) provide a seamless transition between ranges similar to the work/road configuration previously described. Speed change from zero to maximum speed is achieved in a smooth and continuous manner by changing the swash plate angle of the pump 16 under control of controller 100. For high efficiency, the first stall point of the motor 18 in the hydrostatic power unit 12 (i.e., ring gear 42 is a relative zero speed point) is selected in the 7 to 9 km per hour optimum speed range in order to transmit 100% of the power from the power source 4. A full shuttle reverse is also available through the clutches 52 and 54 since the directional change occurs on the input side (upstream side) of the planetary power unit 30. Since directional changes occur on the input side of unit 30, it may be necessary to adjust the position of the swash plate in motor 18 depending upon the desired forward to reverse speed change ratio, and this is done automatically by controller 100. In the low speed pure hydrostatic power flow regenerative heat is kept under control during prolonged creep operation of the work machine 1. Also, in the pure hydrostatic power flow mode, different creep speed ranges can be achieved by engaging different combinations of the range clutches. For example, range gear set A, 80, 82 and B range set 84, 86 can be simultaneously engaged through their respective range selectors 74. Similarly, range set 80 can be combined with C or D to obtain a different creep speed range as selected by the operator of the work machine 1. With this embodiment, it is also possible to shuttle between forward and reverse in either the combined hydro-mechanical mode or the pure hydrostatic mode. Further, in this embodiment, the machine speed can be controlled independent of engine speed enabling constant output speed from the PTO during implement operation.

Referring in particular to FIG. 4, the third embodiment of a hydro-mechanical transmission 10C, like embodiment 10B just discussed, eliminates the operator preselected work range or road range of speeds per se. Again, seamless speed changes from zero to a maximum speed, such as 50 km per hour can be obtained through four gear ranges defined as range "1", "2", "3", and "4" with synchronized shift points between each range to obtain the seamless speed changing. The synchronized ratio changing is automatically controlled by the controller and again takes place on the output side (downstream side) of the planetary power unit 30 which is constructed in the above described manner and has two outputs: a secondary sun gear NS2, and planetary gear carrier N13. As with transmissions 10A and 10B above, the controller is connected to the various actuators 106 of the clutches and pump 16, pressure sensors 110, and speed sensors 112, and also to an input device and power source 4 which is an engine, via conductive paths 108.

Power source 4 of hydro-mechanical transmission 10B selectively drives hydrostatic power unit 12 and planetary power unit 30, which in turn via secondary sun gear NS2 and planetary gear carrier N13, will drive selected ones of a plurality of range gear sets 58 which are coupled to a load L, which, again, will typically be the wheels or tracks of machine 1. Gear sets 58 are variously engageable by range selectors R1, R2, R3 and R4 under control of the controller. The hydrostatic power unit 12 includes a pump 16 in a fluid loop with a motor 18 with the hydrostatic power unit 12 coupled to power source 4 via an input gear N6 and having an output gear N10. The power to the hydrostatic power unit 12 is provided by a driven gear N4 mounted on the forward shaft and engaged with gear N6. Output gear N10 is connected to ring gear NR of planetary power unit 30 via gears N11 and N12.

Planetary power unit 30 is constructed essentially as shown in FIG. 7 but is numbered differently, including a primary sun gear NS1 on a planetary input shaft connectable with power source 4 via a forward clutch 54 or a reverse clutch 52. Power unit 30 is selectively coupled to the load L, coupled to the hydrostatic power unit 12 and selectively coupled to the power source 4, under automatic control of the controller. For connection to the load L, the hydro-mechanical transmission 10C includes an output shaft 60 coupled to the load L which carries an input gear N18 engaged with an output gear N17 on a range 1/2 shaft of range gear set 58, and a gear N22 engaged with a gear N19 on a range 3/4 shaft. The range 1/2 shaft can be coupled to planetary power unit 30 via automatic operation of range selectors R1 and R3 for power flow through gears N13 and N14, or N15 and N16, respectively. The range 3/4 shaft can be coupled to unit 30 via range selectors R3 and R4 for power flow via gears N13 and N20, or N15 and N21. Range 1/2 shaft and range 3/4 shaft can also be simultaneously coupled to power unit 30, to provide dual power flow.

In operation, the continuously variable hydro-mechanical transmission 10C can be operated to have a combined hydrostatic and mechanical power flow by engaging the reverse clutch 52 to power planetary power unit 30 via gears N1, N3, N5 and N7, or engaging forward clutch 54 to power it via gears N1, N8, and N2. It is also possible to operate the hydrostatic mechanical transmission 10C for a pure hydrostatic power flow by disengaging both clutches 52 and 54.

As stated above in this embodiment, there is no selection for a work range or road range per se. However, the ranges provide a seamless transition between ranges similar to the work/road configuration previously described. Speed change from zero to maximum speed is achieved in a smooth and continuous manner by changing the swash plate angle of the pump 16 under control of controller 100. A full shuttle reverse is also available through the clutches 52 and 54 since the directional change occurs on the input side (upstream side) of the planetary power unit 30. Since directional changes occur on the input side of compound planetary unit gear 30, it may be necessary to adjust the position of the swash plate in motor 18 depending upon the desired forward to reverse speed change ratio, and this is done automatically by controller 100. In the low speed pure hydrostatic power flow regenerative heat is kept under control during prolonged creep operation of the work machine 1. Also, in the pure hydrostatic power flow mode, different creep speed ranges can be achieved by engaging different combinations of the range selectors R1-R4.

As noted above, it has been observed that under some operating conditions, torque loads on components of the continuously variable hydro-mechanical transmissions 10A, 10B or 10C can be sufficient, particularly if sustained, to damage the transmission. Such damage has been observed to be more prevalent in the driveline or output portions of the transmissions, that is, in the final gear reduction in connection with load shaft 60 and related elements.

According to the invention, a method of estimating driveline torque of a of a work machine, particularly in the final gear reduction or output member, and limiting the torque for preventing damage to the transmission, and thus eliminating need for torque sensors, is provided. According to the invention, it has been observed that the fluid pressure condition in the hydrostatic power unit 12 will be high when the transmission driveline is subjected to high torque loads, typically when the machine is moving slowly, e.g., creep conditions, or is stationary, under heavy load. It has also been observed that the hydrostatic power unit 12 will have a mechanical efficiency which is a function of the pressure in that unit, swash plate angle, and speed of pump 16. The efficiency will have a value of less than 1 when in the generation mode, and greater than 1 when in the regeneration mode. The motor 18 of the hydrostatic power unit 12 will have a mechanical efficiency which is a function of the pressure in that unit. This pressure will be important for the purposes of the present invention only when high, approaching relief pressure, when potentially damaging driveline torque conditions are likely to be present. The efficiency of the motor 18 can be determined by testing at relevant high pressure, e.g., near relief, and recorded for later use. The efficiency value will be greater than 1 for the regeneration mode, and less than 1 for the generation mode.

It has been further found that the pressure in the hydrostatic power unit 12 will provide an indication of the torque on that unit, and if the operating mode, e.g., generation, regeneration, and the mechanical efficiency of the fluid motor 18 and direction of operation thereof are known or accurately estimated at the pressure, a relatively accurate estimation of the torque on the fluid motor 18 can be made. In turn, the torque on the output of the planetary power unit 30 can be estimated as a function of the torque on the fluid motor 18 and ratios of gears of the planetary unit 30 and those connecting it with the motor 18. The accuracy of this torque estimation can be increased by knowing or estimating the efficiency of the planetary unit 30. The torque load on the driveline, particularly on the output member, e.g. load shaft 60, thereof, can then be estimated as a function of the estimated torque on the planetary unit output, and the ratio of gears connecting the planetary unit 30 to the driveline output member.

Figure 6:
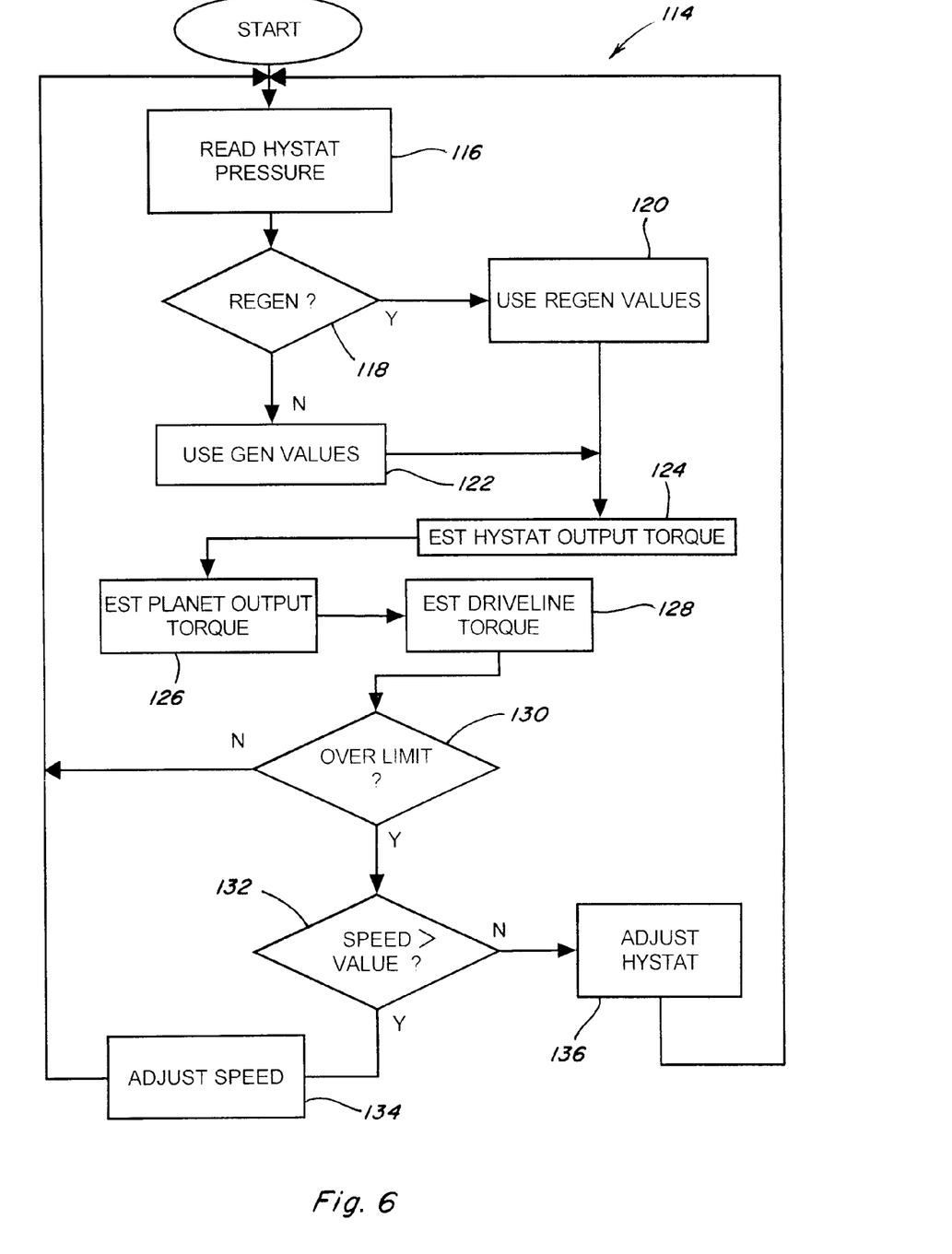
FIG. 6 is a high level flow diagram showing steps of the method of the invention.

Referring also to FIG. 6, a high level flow diagram 114 showing steps of a preferred method of the invention for estimating and limiting driveline torque is shown. The steps of diagram 114 will be performed automatically by the transmission controller, e.g., controller 100, based on command values, e.g., swash plate angle commands and clutch actuation commands outputted to or feedback received from actuators 106, input commands; sensor data received from pressure sensors 110 and speed sensors 112; and also data received from the machine power unit 4. At block 116, operation of the hydrostatic power unit of the transmission is monitored or read, to determine whether that unit is operating in a generation mode or a regeneration mode. This will be determined from a differential between pressure outputs of sensors 110, and also which sensor has a higher or lower pressure, which will be indicative of whether the pump is acting as a pump (generation) or as a motor (regeneration), which will be determined at decision block 118. The invention will then determine a mechanical efficiency of the hydrostatic power unit, in particular, of the motor thereof, as a function of at least the operating mode, e.g., generation or regeneration; pressure; and motor speed, as denoted by respective blocks 120 and 122. The efficiency can be determined by looking up a stored value, previously obtained from testing.

The torque output of the hydrostatic power unit will then be estimated as a function of at least the pressure therein and the mechanical efficiency of the motor, as denoted at block 124. The torque in the motor $T_{motor}$ in N*m in the hydro-mechanical operating mode can be estimated using the following equation.

$$T_{motor} = \frac{P_{HSU} \cdot V_{motor}}{2 \cdot \pi} \cdot \eta_{Motor}$$

where $P_{HSU}$ is the pressure in the hydrostatic power unit in Pa (N/m$^2$); $V_{motor}$ is volume of the motor in m$^3$; and $n_{motor}$ is the mechanical efficiency of the motor. The pressure is positive for non-regenerative mode and negative for re-generation mode. The motor mechanical efficiency is a function of hydrostatic power unit pressure, but as noted above, is only of concern when output torque is high. When torque is high, the hydrostatic power unit pressure will also be high, such that the mechanical efficiency will need only be determined near the relief pressure. The motor efficiency is also slightly a function of the swash plate angle and pump speed, but it has been found that this can be neglected. The best practice has been found to be to measure the efficiency using torque sensors or gauges, as part of a temporary or removable test apparatus, prior to installation of the motor or hydrostatic power unit, and then to save the test values and look up them up later during the transmission operation.

As a next step, the torque output of the planetary power unit will be estimated, as a function of the estimated torque output of the hydrostatic power unit, a ratio of gears drivingly connecting the hydrostatic power unit to the planetary power unit, and ratios of the gears of the planetary power unit, as denoted at block 126.

The torque at the planetary output can be estimated as follows.

For Range 1 and 3 of transmission 10C of FIG. 4, the planetary output torque is denoted $T_{P13}$.

$$T_{P13} = \frac{T_m \cdot \left(\frac{N_{12}}{N_{10}}\right)}{K_1} \cdot (K_1 - 1)$$

where $N_{12}$ is the number of teeth of gear N12; $N_{10}$ is the number of teeth of gear N10; and $K_1$ is determined according to the formula below.

$$K_1 = -\frac{N_R}{N_{P2}} \cdot \frac{N_{P1}}{N_{S1}}$$

where $N_R$ is the number of teeth of the ring gear of the planetary; $N_{P1}$ is the number of teeth of each planet gear NP1; $N_{P2}$ is the number of teeth of each planet gear NP2; and $N_{S1}$ is the number of teeth of the primary sun gear NS1.

For Range 2 and 4, the planetary output torque is denoted $T_{P24}$.

$$T_{P24} = \frac{T_m \cdot \left(\frac{N_{12}}{N_{10}}\right)}{\left(\frac{(K_2-1)K_1}{(K_2-K_1)}\right)} \cdot \left[\frac{(K_2-1) \cdot K_1}{(K_2-K_1)} - 1\right]$$

and $$K_2 = \frac{N_{S2}}{N_{P2}} \cdot \frac{N_{P1}}{N_{S1}}$$

where $N_{S2}$ is the number of teeth of the secondary sun gear NS2.

The torque on the output member of the driveline of the transmission will then be estimated as a function of the estimated torque output of the planetary power unit and ratios of gears drivingly connecting the planetary power unit to the output member, as denoted at block 128.

The output torque can now be written in terms of the planetary torque for each range as follows.

For Range 1, the output torque $T_{O1}$ is estimated using the equation $$T_{O1} = \frac{T_P}{\left(\frac{N_{13}}{N_{14}}\right) \cdot \left(\frac{N_{17}}{N_{18}}\right)} \cdot \eta_{planetary}$$

where $N_{13}$ is the number of teeth of the gear N13; $N_{14}$ is the number of teeth of gear N14; $N_{17}$ is the number of teeth of gear N17; $N_{18}$ is the number of teeth of gear N18, and n is the efficiency of the planetary power unit, which can be known or determined through testing.

For Range 2, the output torque $T_{O2}$ is estimated using the equation $$T_{O2} = \frac{T_P}{\left(\frac{N_{15}}{N_{16}}\right) \cdot \left(\frac{N_{17}}{N_{18}}\right)} \cdot \eta_{planetary}$$

where $N_{15}$ is the number of teeth of the gear N15; and $N_{16}$ is the number of teeth of gear N16.

For Range 3 the output torque $T_{O3}$ is estimated using the equation $$T_{O3} = \frac{T_P}{\left(\frac{N_{13}}{N_{20}}\right) \cdot \left(\frac{N_{20}}{N_{22}}\right)} \cdot \eta_{planetary}$$

where $N_{19}$ is the number of teeth of the gear N19; $N_{20}$ is the number of teeth of gear N20; $N_{21}$ is the number of teeth of gear N21; and $N_{22}$ is the number of teeth of gear N22.

For Range 4, the output torque $T_{O4}$ is estimated using the equation $$T_{O4} = \frac{T_P}{\left(\frac{N_{15}}{N_{21}}\right) \cdot \left(\frac{N_{19}}{N_{22}}\right)} \cdot \eta_{planetary}$$

where
$T_{O1} = M_{O1} \cdot M_{P13} \cdot T_m$
$T_{O2} = M_{O2} \cdot M_{P24} \cdot T_m$
$T_{O3} = M_{O3} \cdot M_{P13} \cdot T_m$
$T_{O4} = M_{O4} \cdot M_{P24} \cdot T_m$
where $$M_{P13} = \frac{\left(\frac{N_{12}}{N_{10}}\right)}{K_1} \cdot (K_1 - 1)$$

$$M_{P24} = \frac{\left(\frac{N_{12}}{N_{10}}\right)}{\left(\frac{(K_2-1) \cdot K_1}{(K_2-K_1)}\right)} \cdot \left[\frac{(K_2-1) \cdot K_1}{(K_2-K_1)} - 1\right]$$

$$M_{O1} = \frac{1}{\left(\frac{N_{13}}{N_{14}}\right) \cdot \left(\frac{N_{17}}{N_{18}}\right)} \cdot \eta_{planetary}$$

-continued $$M_{O2} = \frac{1}{\left(\frac{N_{15}}{N_{16}}\right)\cdot\left(\frac{N_{17}}{N_{18}}\right)} \cdot \eta_{planetry}$$

$$M_{O3} = \frac{1}{\left(\frac{N_{13}}{N_{20}}\right)\cdot\left(\frac{N_{19}}{N_{22}}\right)} \cdot \eta_{planetry}$$

$$M_{O4} = \frac{1}{\left(\frac{N_{15}}{N_{21}}\right)\cdot\left(\frac{N_{19}}{N_{22}}\right)} \cdot \eta_{planetry}$$

If the estimated torque on the output member is greater than a predetermined value or limit, for instance, a threshold value above which damage to the driveline is likely or expected to occur, as determined at decision block 130, then an operating parameter of the transmission will be changed to reduce the torque. In this regard, the speed of the machine or output member can be read from sensor 112, and if the speed is greater than a predetermined value, as determined at decision block 132, the speed of movement can be adjusted, e.g., lowered, as denoted by block 134, but preferably without reducing power source speed, such that other systems run by the engine are not affected. This may entail adjusting the swash plate angle, to lower the pressure in the hydrostatic power unit and thus the torque output thereof. If, at block 136 the speed is not greater than the predetermined value, the hydrostatic power unit can also be adjusted, in the just described manner, to lower pressure therein and thus torque. The output torque is related to the drawbar force (or traction force), $$F_{drawbar} = T_O \cdot \text{Ratio}_{Final\_Drive}/\text{Tire\_Radius}$$

And, if torque loads on the range clutches is important, the torque at each clutch can be related to the output torque of the transmission as follows, $$T_{C1C2} = T_O \cdot \left(\frac{N_{17}}{N_{18}}\right)$$

and $$T_{C3C4} = T_O \cdot \left(\frac{N_{19}}{N_{22}}\right)$$

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A method for automatically limiting a torque on a driveline of a continuously variable hydro-mechanical transmission of a work machine having an engine, comprising steps of:
sensing a pressure condition in a hydrostatic power unit of the transmission, and if the pressure is high, estimating the mechanical efficiency of the motor of the hydrostatic power unit by monitoring an operating mode to determine whether the operation of the hydrostatic power unit is in a generation mode or a regeneration mode, providing the pressure, and determining a motor speed thereof;
providing an estimated torque output of the hydrostatic power unit based on the pressure, and if the pressure is high, including the mechanical efficiency of the motor in the estimated torque output;
estimating a torque output of a planetary power unit of the transmission as a function of the estimated torque output of the hydrostatic power unit, a ratio of gears drivingly connecting the hydrostatic power unit to the planetary power unit, and ratios of the gears of the planetary power unit;
estimating the torque on an output member of the driveline of the transmission as a function of the estimated torque output of the planetary power unit and ratios of gears drivingly connecting the planetary power unit to an output of the transmission;
if the estimated torque on the output member is greater than a predetermined value, then changing an operating parameter of the transmission to reduce the torque on the output member without reducing speed unless the speed is greater than a second predetermined value, and
if the speed is greater than the second predetermined value, then reducing speed without reducing power to other systems run by the engine.

2. The method of claim 1, wherein if the output member is moving, then the step of changing the operating parameter will comprise reducing a speed of movement thereof.

3. The method of claim 2, wherein the speed of movement will be reduced by changing an output speed of the hydrostatic power unit.

4. The method of claim 3, wherein the speed of movement will be reduced by changing a speed range with the changing of the output speed of the hydrostatic power unit.

5. The method of claim 1, wherein the step of determining the torque on the output member of the driveline of the transmission as a function of the estimated torque output of the planetary power unit and ratios of gears drivingly connecting the planetary power unit to an output of the transmission, comprises determining which one of at least two gear sets drivingly connects the planetary power unit to the output member.

6. The method of claim 1, wherein the step of estimating the torque output of the planetary power unit is additionally a function of an efficiency value determined therefor.

7. The method of claim 1, wherein if the output member is not moving, then the step of changing the operating parameter comprises changing an angle of a swash plate of a motor or a pump of the hydrostatic power unit.

8. The method of claim 1, wherein the step of estimating the mechanical efficiency includes estimating torque in the motor $T_{motor}$ in N*m in the hydro mechanical operating mode using the following equation:

$$T_{motor} = \frac{P_{HSU} \cdot V_{motor}}{2 \cdot \pi} \cdot \eta_{Motor}$$

where $P_{HSU}$ is the pressure in the hydrostatic power unit in Pa (N/m$^2$); $V_{motor}$ is volume of the motor in m$^3$; $n_{motor}$ is the mechanical efficiency of the motor, and the pressure is positive for non-regenerative mode and negative for re-generation mode.

9. A method for automatically estimating and limiting torque on an output member of a driveline of a continuously variable hydro-mechanical transmission of a work machine having an engine during operation thereof, comprising steps of:

monitoring operation of a hydrostatic power unit of the transmission to determine whether the power unit is operating in a generation mode or a regeneration mode;

sensing a pressure condition in a hydrostatic power unit of the transmission, and if the pressure is high, determining a mechanical efficiency of the motor of the hydrostatic power unit as a function of at least the operating mode, the pressure, and a motor operating speed thereof;

estimating a torque output of the hydrostatic power unit as a function of at least the pressure therein, and when the pressure is high, including the estimated mechanical efficiency of the motor in the estimated torque output;

estimating a torque output of a planetary power unit of the transmission as a function of the estimated torque output of the hydrostatic power unit, a ratio of gears drivingly connecting the hydrostatic power unit to the planetary power unit, and ratios of the gears of the planetary power unit;

estimating the torque on the output member of the transmission as a function of the estimated torque output of the planetary power unit and ratios of gears drivingly connecting the planetary power unit to the output member; and if the estimated torque on the output member is greater than a predetermined value, then changing an operating parameter of the transmission to reduce the torque on the output member without reducing speed unless the speed is greater than a second predetermined value, and if the speed is greater than the second predetermined value, then reducing speed without reducing power to other systems run by the engine.

10. The method of claim 9, wherein if the output member is moving, then the step of changing the operating parameter will comprise reducing a speed of movement thereof.

11. The method of claim 10, wherein the speed of movement will be reduced by changing an output speed of the hydrostatic power unit.

12. The method of claim 11, wherein the speed of movement will be reduced by additionally changing a speed range of the transmission.

13. The method of claim 9, wherein if the output member is not moving, then the step of changing the operating parameter comprises changing an angle of a swash plate of a motor or pump of the hydrostatic power unit.

14. The method of claim 9, wherein the step of estimating the mechanical efficiency includes estimating torque in the motor $T_{motor}$ in N*m in the hydro-mechanical operating mode using the following equation:

$$T_{motor} = \frac{P_{HSU} \cdot V_{motor}}{2 \cdot \pi} \cdot \eta_{Motor}$$

where $P_{HSU}$ is the pressure in the hydrostatic power unit in Pa (N/m²); $V_{motor}$ is volume of the motor in m³; $n_{motor}$ is the mechanical efficiency of the motor, and the pressure is positive for non-regenerative mode and negative for re-generation mode.

15. The method of claim 9, wherein the step of determining the torque on the output member of the driveline of the transmission as a function of the estimated torque output of the planetary power unit and ratios of gears drivingly connecting the planetary power unit to an output of the transmission, comprises determining which one of at least two gear sets drivingly connects the planetary power unit to the output member.

* * * * *